(12) United States Patent
Herman et al.

(10) Patent No.: US 10,824,879 B2
(45) Date of Patent: Nov. 3, 2020

(54) METHOD, DEVICE, AND COMPUTER PROGRAM FOR DETECTING AN OBJECT

(71) Applicant: Robert Bosch GmbH, Stuttgart (DE)

(72) Inventors: Michael Herman, Boeblingen (DE); Joerg Wagner, Renningen (DE); Volker Fischer, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 171 days.

(21) Appl. No.: 16/168,217

(22) Filed: Oct. 23, 2018

(65) Prior Publication Data
US 2019/0138820 A1 May 9, 2019

(30) Foreign Application Priority Data

Nov. 6, 2017 (DE) .................. 10 2017 219 673

(51) Int. Cl.
| | |
|---|---|
| *G06K 9/00* | (2006.01) |
| *G06K 9/62* | (2006.01) |
| *G06K 9/46* | (2006.01) |

(52) U.S. Cl.
CPC ..... *G06K 9/00791* (2013.01); *G06K 9/00805* (2013.01); *G06K 9/4628* (2013.01); *G06K 9/6262* (2013.01); *G06K 9/6271* (2013.01)

(58) Field of Classification Search
CPC ............ G06K 9/00791; G06K 9/6262; G06K 9/00805; G06K 9/4628; G06K 9/6271
See application file for complete search history.

(56) References Cited

U.S. PATENT DOCUMENTS

| | | | |
|---|---|---|---|
| 5,448,484 A | 9/1995 | Bullock et al. | |
| 9,760,806 B1* | 9/2017 | Ning | G06N 3/0454 |
| 10,013,640 B1* | 7/2018 | Angelova | G06N 3/0454 |
| 10,210,860 B1* | 2/2019 | Ward | G10L 15/063 |
| 2017/0255832 A1* | 9/2017 | Jones | G06N 3/0454 |
| 2018/0306912 A1* | 10/2018 | Branson | G01S 13/931 |

OTHER PUBLICATIONS

Sak, et al.: "Long Short-Term Memory Recurrent Neural Network Architectures for Large Scale Acoustic Modeling", (2014), URL:http://static.goog leusercontent.com/media/reserach.google.com/en/pubs/archive/43905.pdf, pp. 1-5.
Woellmer, et al.: "Online Driver Distraction Detection Using Long Short-Term Memoty", IEEE Translations of Intelligent Transportation Systems 12(2), (2011), pp. 574-582.

\* cited by examiner

*Primary Examiner* — Charles T Shedrick
(74) *Attorney, Agent, or Firm* — Norton Rose Fulbright US LLP; Gerard Messina (57) ABSTRACT

A method for detecting an object with the aid of a system, the system having a plurality of modules connected in series one after the other, at least one connection between a predefinable module and its immediately following module being implemented in each case with the aid of a filter and storage module connected in series, the first module of the modules connected in series being connected to an acquisition unit, and the last module of the modules connected in series being connected to a detection module. The method includes temporal filtering.

8 Claims, 6 Drawing Sheets

METHOD, DEVICE, AND COMPUTER PROGRAM FOR DETECTING AN OBJECT

CROSS REFERENCE

The present application claims the benefit under 35 U.S.C. § 119 of German Patent Application No. DE 102017219673.4 filed on Nov. 6, 2017, which is expressly incorporated herein by reference in its entirety.

FIELD

The present invention relates to a method for detecting an object with the aid of a system. The system includes a plurality of modules connected in series one after the other, where at least one connection between a predefinable module and its immediately following module is implemented using a filter and storage module connected in series. The present invention also relates to a device and to a computer program, which are developed to carry out the present method.

BACKGROUND INFORMATION

U.S. Pat. No. 5,448,484 A describes a method for detecting the presence of a vehicle in a traffic zone with the aid of a neural network. The neural network includes input units, hidden units and output units, an output of each of the mentioned input units being connected to an input of each of the hidden units. An output of each of the hidden units is connected to an input of each of the output units. The neural network generates an output signal at each of the output units, and indicates whether a vehicle has been detected in a detection zone.

SUMMARY

The present method may have the advantage that temporal filtering of the input variables is carried out with the aid of a filter concept, thereby achieving a robustness with regard to inaccurate environment recordings, in particular of traffic scenes. As a result, it is possible to use the present method for the detection of objects even under poor environmental conditions. Poor environmental conditions may lead to an inaccurate recording of the environment and have a negative effect on the detection of an object. With the aid of the temporal filtering, an inaccuracy and/or an ambiguity in the environment recording, due to the poor environmental conditions, for instance, is/are able to be resolved. This allows the present method to detect an object in a reliable manner, e.g., also at night, in the presence of rain/snow, during rapid changes in the environmental brightness such as during tunnel travel or when a portion of the object is temporarily masked. Furthermore, because of the special structure of the filter concept, it is possible to reuse the calculated quantities within the system, so that a parameter-efficient and thus also a computationally efficient system is achieved. In the same way, a decoupling of the calculated variables of the individual modules of the system is achieved by the special structure of the filter concept inasmuch as the calculated variables are no longer dependent on the output variables of the respective preceding modules of the system, but instead all output variables of all preceding modules of the system are able to be used again. Another advantage of the present method is that because of the temporal filtering, it is possible to train the model even with training data that are not completely labeled. Due to the temporal filtering, many training data that are sparsely labeled are able to be used for training the system.

In a first aspect, the present invention relates to a method for detecting an object with the aid of a system. The system includes a plurality of modules which are connected in series one after the other. At least one connection between a predefinable module and its immediately following module is implemented using a filter and storage module connected in series in each case. The first module of the modules connected in series is connected to an acquisition unit, and the last module of the modules connected in series is connected to a detection module. The present method includes the following steps:

Providing an input variable for the first module of the modules connected in series, with the aid of the acquisition unit.

Successively ascertaining along the modules connected in series, starting with the first module of the modules connected in series, an output variable of each module as a function of an input variable of the respective module and a parameterization of the respective module. The output variable of the predefinable module is filtered with the aid of the filter module, and the filter module ascertains an output variable as a function of the output variable of the predefinable module and a temporally preceding intermediate variable. The filter module ascertains a temporally instantaneous intermediate variable as a function of the temporally preceding output variable of the predefinable module and a temporally preceding intermediate variable. The temporally preceding intermediate variable was ascertained with the aid of the filter module as a function of a temporally preceding output variable of the predefinable module. The output variable of the filter module and at least one input variable of one of the preceding modules of the predefinable module are combined to form a storage variable, using the storage module, and made available as an input variable for the immediately following module.

A successive ascertainment may be understood to describe that starting with the first module, its output variable is ascertained, and then, once the output variable of the preceding module has been ascertained, its immediately following module ascertains an output variable as a function of the output variable of its immediately preceding module, i.e., in a step by step manner until the last module has ascertained its output variable.

The temporally preceding intermediate variable may be understood as the particular intermediate variable of the temporal sequence of intermediate variables that is allocated to a predefinable preceding instant, in particular an immediately preceding instant. The temporally instantaneous intermediate variable may be understood as the particular intermediate variable of the temporal sequence of intermediate variables that is allocated to a predefinable instantaneous instant. The temporally preceding output variable of the predefinable module may be understood as the particular output variable of the temporal sequence of output variables that is allocated to a predefinable preceding instant, in particular an immediately preceding instant.

In one particularly advantageous specific embodiment of the first aspect of the present invention, the filter module filters the output variable of the predefinable module as a function of the temporally preceding intermediate variable, the temporally preceding intermediate variable characterizing the temporal development of the output variable of the predefinable module.

In one further advantageous embodiment, the filter module includes a normalization module and an activation module, and a LSTM module (Long Short Term Memory module). The modules include a machine learning system in each case. The temporally instantaneous intermediate variable is ascertained with the aid of the LSTM module as a function of the input variable of the LSTM module and the temporally preceding intermediate variable.

A machine learning system, for example, may be a deep neural network. A deep neural network particularly may be understood as a neural network that has a plurality of layers.

A normalization module may be understood as a module which ascertains its output variable in such a way that each output variable of the normalization module lies within the same predefinable number interval. The activation module may be understood as a module that outputs its input variable in enlarged or reduced form at the output as a function of a predefinable multiplication factor.

It is particularly advantageous if the filter module additionally has a bridging connection (skip connection/shortcut connection). When filtering the output variable of the predefinable module with the aid of the filter module, the input variable of the filter module is forwarded to the output of the filter module with the aid of the bridging connection. At the output of the filter module, the input variable of the filter module is added to the output variable of the filter module. This has the advantage that because of the bridging connection, the ascertainment of the parameterization of the modules connected in series is able to be managed in a more optimal manner. This is so because it may be avoided due to the bridging connection that the gradients preferably used for ascertaining the parameterization become negligibly small or too large during the ascertainment. As a result, the bridging connection allows for a more reliable ascertainment of a suitable parameterization.

It is furthermore particularly advantageous if the filter module additionally includes a decoding module. The decoding module connects the LSTM module and the output of the filter module. While the output variable of the predefinable module is filtered with the aid of the filter module, the output variable of the LSTM module is decoded by the decoding module so that the output variable of the filter module has the same number of dimensions as the input variable of the filter module forwarded with the aid of the bridging connection. This allows the number of dimensions of the output variable of the LSTM module to be selected at will since the number of dimensions is adapted with the aid of the decoding module. This offers the advantage that no information can get lost by the change in the dimensions by the decoding module and it is possible to provide an additional degree of freedom, [i.e.] the selection of the number of dimensions of the output variable of the LSTM module.

It is advantageous if the connection between the last module of the modules connected in series and the detection module is established with the aid of a third storage module. The output variable of the last module and at least one output variable of a connecting filter module of two consecutive modules of the modules connected in series are combined into a storage variable by the third storage module.

It is advantageous if a compression module is inserted upstream from a predefinable module, which compresses the input variable of the module, in particular by reducing the dimension of the input variable. This has the advantage that negligibly small or redundant values that may be included in the output variable of a preceding module are able to be removed, e.g., by a dimension reduction, and unnecessary calculations may be avoided.

It is particularly advantageous if an object is detected with the aid of a detection module at the output of the last module of the modules connected in series, and an at least partially autonomous machine is actuated as a function of the detected object. An at least partially autonomous machine, for example, may be a vehicle or also a robot.

In a further aspect, the present invention relates to a computer program, which is set up to carry out one of the aforementioned methods, that is to say, which includes instructions that induce a computer to carry out one of the aforementioned methods with all its steps when the computer program is running on the computer. In addition, the present invention relates to a machine-readable memory module in which the computer program is stored, and to a device, which is developed to carry out one of the aforementioned methods.

Exemplary embodiments of the present invention are illustrated in the figures and are described in greater detail below.

DETAILED DESCRIPTION OF EXAMPLE EMBODIMENTS

Figure 1:
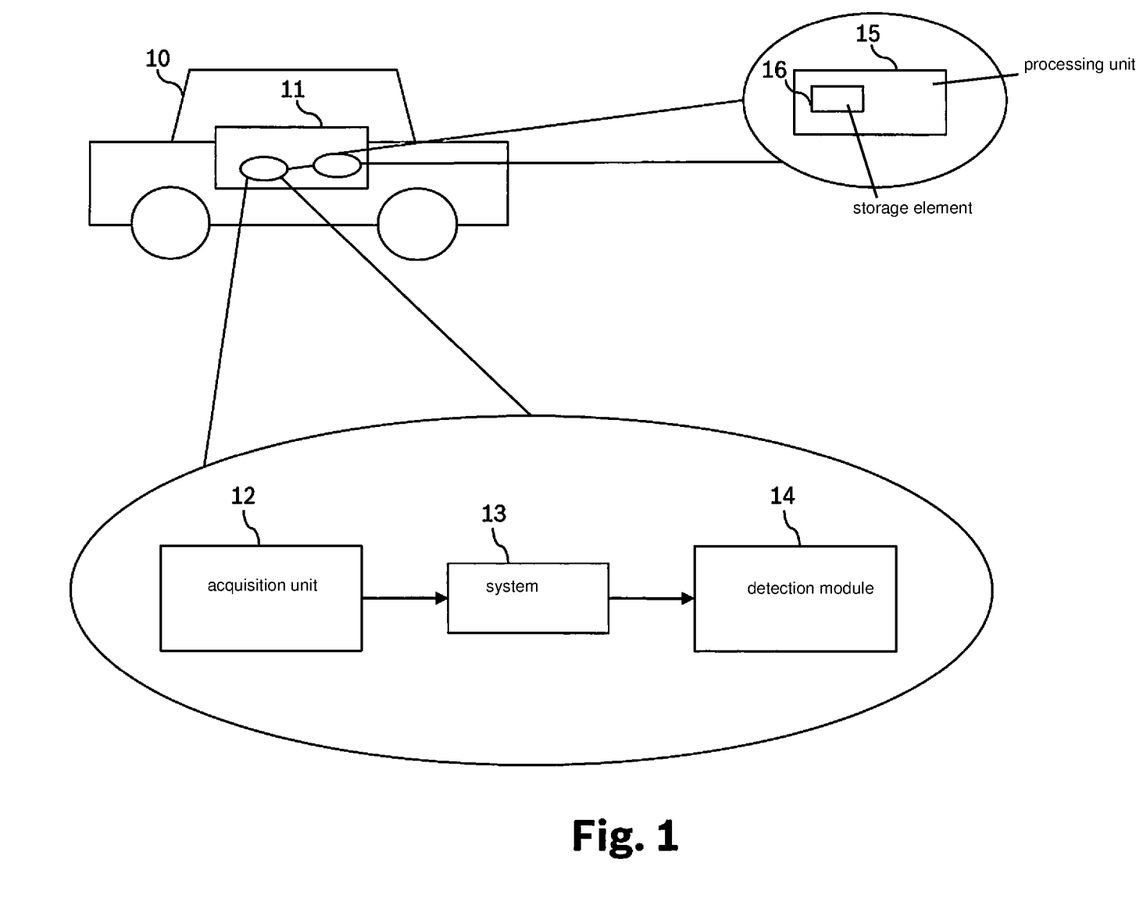
FIG. 1 is a schematic illustration of a vehicle, which includes a specific embodiment of a system for detecting an object.

FIG. 1 shows a schematic, exemplary illustration of a vehicle (10), which includes a device (11). Device (11) is made up of a plurality of components (12, 13, 14) which are connected to one another in series. The connected components (12, 13, 14) may preferably be connected to a processing unit (15). The processing unit (15) may encompass a storage element (16).

The first component is an acquisition unit (12), which is connected to a system (13), and the component (14) is a detection module. The acquisition unit (12) is set up to detect the environment of the vehicle (10) and preferably is a camera, but it may also have other sensors for sensing the environment. The detection module (14) is set up to detect an object as a function of the output variable of the system (13). It is possible that the vehicle (10) is controlled as a function of the object, preferably with the aid of a control unit of the vehicle (10), for instance in such a way that a collision with the object is prevented or the object is evaded.

Figure 2:
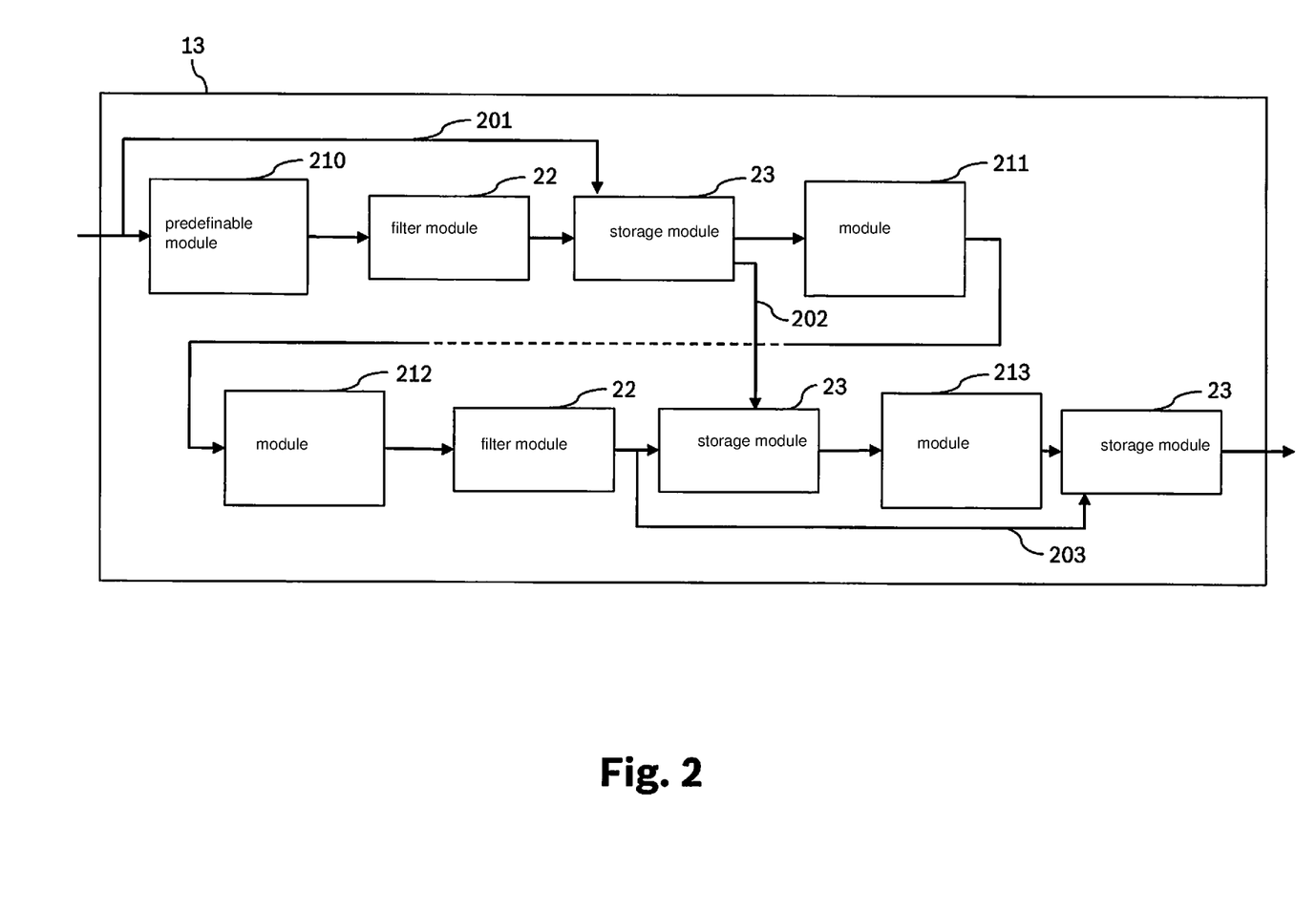
FIG. 2 is a schematic illustration of a specific embodiment of a section of the system for detecting an object, which includes a plurality of modules connected in series one after the other, and filter and storage modules connected in series.

FIG. 2 shows a schematic illustration of the system (13) for detecting an object according to one specific embodiment. The system (13) encompasses a plurality of modules (210, 211, 212, 213) connected in series one behind the other. The individual modules (210, 211, 212, 213) have a parameterization and may preferably include a machine learning system in each case, in particular a deep neural network which has at least one layer with neurons. The modules (210, 211, 212, 213) determine the output variable of the module as a function of the respective parameterization of the module and the respective input variable of the module.

At least one connection is implemented between the modules (210, 211, 212, 213) that are connected in series, between a predefinable module (210) and its immediately downstream module (211), using a filter and storage module (22, 23) connected in series in each case. The output variable of the predefinable module (210) is filtered with the aid of the filter module (22). The filter module (22) ascertains an output variable as a function of the output variable of the predefinable module (210) and a temporally immediately preceding ascertained intermediate variable ($z_{t-1}$). The temporally preceding intermediate variable ($z_{t-1}$) was ascertained by the filter module (22) as a function of the temporally immediately preceding output variable of the predefinable module (210). Next, the output variable of the filter module (22) is forwarded to the storage module (23). The storage module (23) combines the ascertained output variable of the filter module (22) and at least one input variable of one of the preceding modules (210) of the filter module (22) into a storage variable. The input variable of the preceding module (210) of the filter module (22) may be conveyed to the storage module (23) via a connection (201). Optionally, if provided, it is also possible to convey the output variable of a preceding filter module to this storage module and to take it into account in the aforementioned storage variable.

The storage module then stores the combined storage variable. The storage variable of the storage module (23) is subsequently forwarded to the immediately following module (211) of the predefinable module (210).

The filter module (22) preferably filters the output variable of the predefinable module (210) as a function of the temporal development of the output variable of the predefinable module (210) using the temporally preceding intermediate variable ($z_{t-1}$). The temporally preceding intermediate variable ($z_{t-1}$) preferably characterizes the temporal development of the output variable of the predefinable module (210).

It is also shown in FIG. 2 that further filter and storage modules (22, 23) may be connected between further predefinable modules (212, 213). As soon as the system (13) includes a plurality of filter and storage modules (22, 23), it is possible to convey the content of a predefinable preceding storage module to a following storage module, preferably via a connection (202), and to take it into account in the storage variable of the following storage module. This has the advantageous effect that the ascertained output variables of the filter modules (22) may be aggregated in the storage modules (23), forwarded, and at least partially be used again in the following modules.

A further storage module (23) is preferably disposed following the last module (213) of the modules (210, 211, 212, 213) connected in series. This storage module may receive as an input variable the output variable of the last module (213) and at least one output variable of a preceding filter module as an input variable, using a connection (203). This makes it possible to store the filtered output variables of the preceding filter modules in this last storage module. As an alternative, it is also possible to store other arbitrarily predefinable output variables of the modules (210, 211, 212, 213) or the filter or storage modules (22, 23) in the last storage module.

Figure 3:
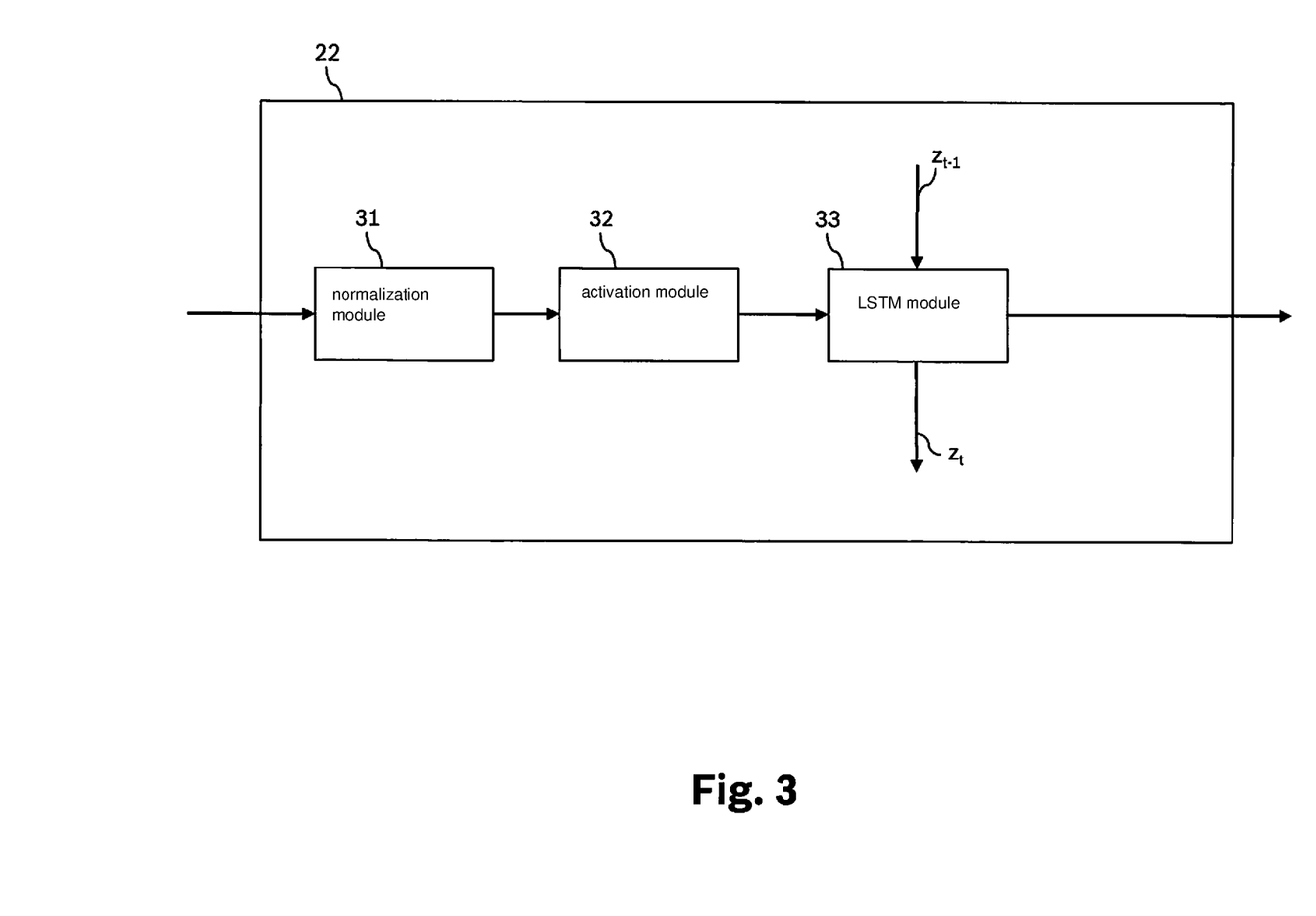
FIG. 3 is a schematic illustration of a specific embodiment of a filter module, which includes a normalization module, an activation module, and a LSTM module.

FIG. 3 shows a schematic illustration of a specific embodiment of the filter module (22). In this specific embodiment the filter module (22) includes a normalization module (31), which is connected in series to an activation module (32) and to a LSTM module (33). Alternatively, the filter module (22) may also include a Kalman filter. The normalization module (31) is set up to normalize the input variable of the filter module (22) using a normalization operation; more specifically, the greatest encompassed variable of the input variable of the filter module (22) is used to divide the input variable thereby so that the greatest encompassed variable of the input variable of the filter module (22) is normalized to 1. Also possible are other normalization operations, such as an average value adjustment, and/or a standardization of the standard deviation of the input variable of the standardization module (31). The following activation module (32) is preferably a module which outputs an output variable as soon as the input variable of the activation module (32) exceeds a particular value. However, it is also possible that the activation module (32) includes a function, preferably a ReLu function (Rectified Linear Unit function) or a sigmoid function, and the activation module (32) is able to ascertain an output variable as a function of the input variable of the activation module (32) and the function. The LSTM module (33) is able to ascertain an output variable and a temporally instantaneous intermediate variable ($z_t$) as a function of a temporally preceding intermediate variable ($z_{t-1}$) and the output variable of the activation module (32).

In this specific embodiment of the filter module (22), the LSTM module (33) is used to obtain temporal filtering of the output variable of the preceding module of the filter module (22). This temporal filtering with the aid of the temporally preceding intermediate variable ($z_{t-1}$) has the result of achieving robustness, especially with regard to output variables from the acquisition unit (12) that are tainted by noise or ambiguity. It is particularly preferred if the temporally preceding intermediate variable ($z_{t-1}$) characterizes the temporal development of the output variable of the predefinable module (210), the reason being that the consideration of the temporal development of the output variable of the predefinable module (210) makes it possible to resolve inaccuracies or ambiguities of the output variables of the acquisition unit (12) or to obtain lower susceptibility to ambiguity or lower ambiguities.

If the input variable of the system (13) is multi-dimensional, and in particular if it encompasses an image or a video sequence, then the LSTM module (33) is preferably a convolutional LSTM module.

Figure 4:
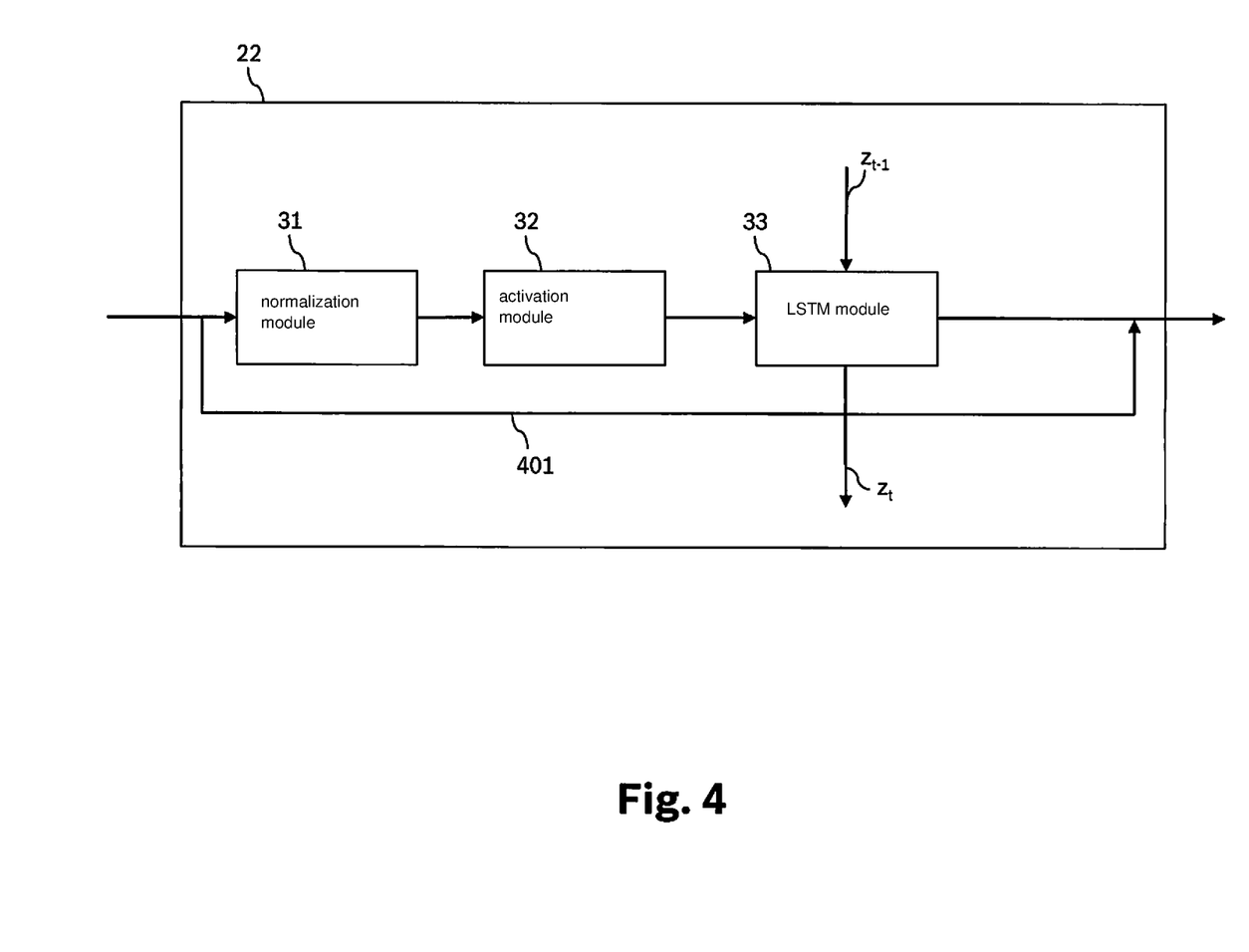
FIG. 4 is a schematic illustration of an alternative specific embodiment of the filter module, the filter module additionally having a bridging connection.

FIG. 4 shows an advantageous further refinement of a specific embodiment of the filter module (22). This further refinement of the filter module (22) differs from the specific embodiment in FIG. 3 in that it uses a bridging connection (401). This bridging connection (401) connects the input of the filter module (22) to the output of the filter module (22). Because of the bridging connection (401), the input variable is added to the ascertained output variable of the filter module (22). It should be noted in this context that the dimensions of the input variable of the filter module (22) and the ascertained output variable of the LSTM module (33) must be identical in this specific embodiment.

Figure 5:
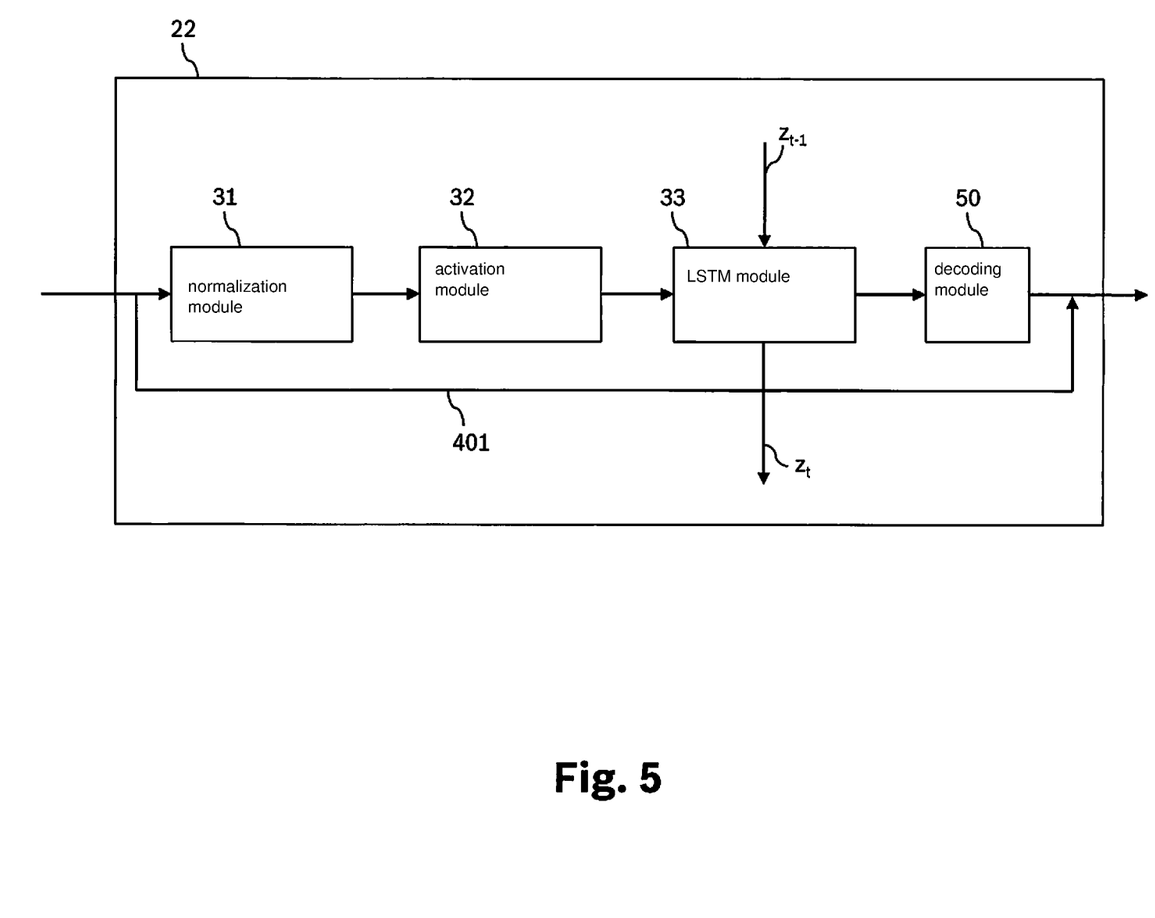
FIG. 5 is a schematic illustration of a further alternative specific embodiment of the filter module with the addition of a decoding module.

FIG. 5 shows an alternative further refinement of a specific embodiment of the filter module (22). It differs from the further refinement in FIG. 4 in that a decoding module (50) is interconnected downstream from the LSTM module (33) and upstream from the connection of the bridging connection (401) to the output of the filter module (22). The decoding module (50) decodes the output variable of the LSTM module (33) in such a way that the dimensions of the forwarded input variable of the filter module (22) and the ascertained output variable of the filter module (22) are identical.

Figure 6:
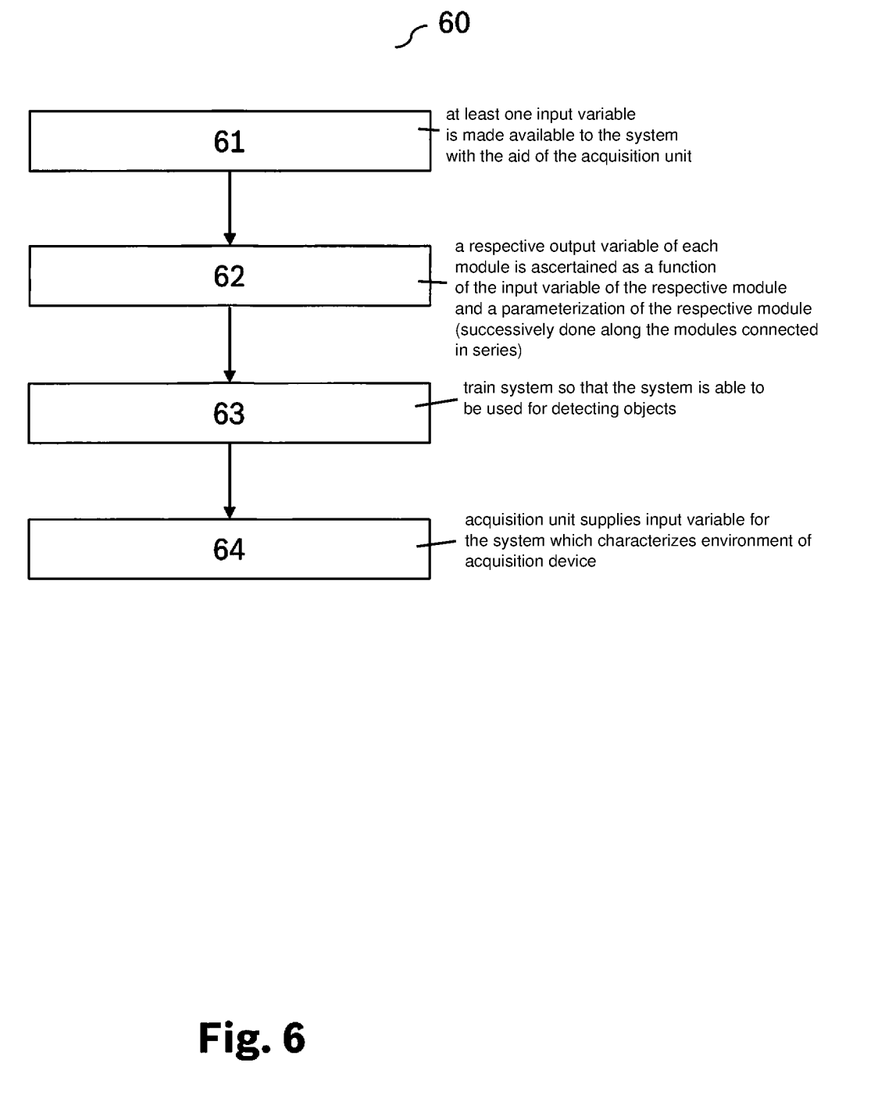
FIG. 6 is a schematic illustration of a specific embodiment of a method that is executed on a computer, for operating the system for detecting an object.

FIG. 6 shows a schematic representation of a specific embodiment of the present method (60) for detecting an object with the aid of the system (13).

The method (60) begins with step 61. In step 61, at least one input variable is made available to the system (13) with the aid of the acquisition unit (12).

In following step 62, a respective output variable of each module is ascertained as a function of the input variable of the respective module and a parameterization of the respective module, this being done successively along the modules (210, 211, 212, 213) connected in series, starting with the first module (210) of the modules (210, 211, 212, 213) connected in series. If a filter module and storage module is connected between two predefinable modules (210, 211), then the output variables of the filter and storage modules (22, 23) are successively ascertained after the output variable of the first module (210) has been determined. The output variable of the storage module (23) is then used to successively ascertain the output variables of the respective modules along the modules (210, 211, 212, 213).

After step 62 has been concluded, step 63 follows. In step 63, the system (13) is trained so that the system is able to be used for detecting objects. During the training of the system (13), the parameterizations of the modules (210, 211, 212, 213) are determined as a function of the supplied input variable of the system (13) and the ascertained output variable from step 62, in particular using an optimization method such as a gradient-descent method. All parameterizations of the modules (210, 211, 212, 213) and each used filter module (22) are preferably determined using the optimization method. Step 62 is optionally able to be carried out repeatedly or carried out for multiple supplied input variables for the more accurate training of the system (13).

If the system (13) was trained in step 63 and is able to be used for detecting objects, then step 64 follows. In step 64, the acquisition unit (12) supplies an input variable for the system (13), which, for instance, characterizes the environment of the acquisition unit (12). The system (13) successively ascertains an output variable as a function of the input variable. The detection module (14) is subsequently used to detect an object as a function of the ascertained output variable of the system (13). Optionally, the vehicle (11) may be controlled in step 64 as a function of the detected object.

In one further exemplary embodiment of the present method (60), it is possible that the method (60) cyclically begins with step 61 after step 64 has been concluded, for example if the system (13) is to be set up for some other application. Alternatively, step 64 may be initiated anew after the conclusion of step 64.

What is claimed is:

1. A method for detecting an object with the aid of a system, the system having a plurality of modules connected in series one after the other, at least one connection between a predefinable module and its immediately following module being implemented with the aid of a filter and storage module connected in series in each case, a first module of the modules connected in series being connected to an acquisition unit, and a last module of the modules connected in series being connected to a detection module, the method comprising:
providing an input variable for the first module of the modules connected in series, with the aid of the acquisition unit; and
successively ascertaining along the modules connected in series, starting with the first module of the modules connected in series, an output variable of each of the modules connected in series as a function of an input variable of the respective module and a parameterization of the respective module, the output variable of the predefinable module being filtered with the aid of the filter module, the filter module ascertaining an output variable as a function of the output variable of the predefinable module and a temporally preceding intermediate variable, the filter module ascertaining a temporally instantaneous intermediate variable as a function of the temporally preceding output variable of the predefinable module and a temporally preceding intermediate variable,
the temporally preceding intermediate variable having been ascertained as a function of a temporally preceding output variable of the predefinable module, with the aid of the filter module, the output variable of the filter module and at least one input variable of one of the preceding modules of the predefinable module being combined into a storage variable with the aid of the storage module and being supplied as an input variable for the immediately following module;
wherein the filter module additionally has a bridging connection, and when filtering the output variable of the predefinable module with the aid of the filter module, the input variable of the filter module is forwarded with the aid of the bridging connection to the output of the filter module and the input variable of the filter module is added at the output of the filter module to the output variable of the filter module.

2. The method as recited in claim 1, wherein the filter module filters the output variable of the predefinable module as a function of the temporally preceding intermediate variable, the temporally preceding intermediate variable characterizing a temporal development of the output variable of the predefinable module.

3. The method as recited in claim 1, wherein the filter module includes a normalization module and an activation module and a LSTM module, and the modules connected in series each include a machine learning system, and the temporally instantaneous intermediate variable being ascertained with the aid of the LSTM module as a function of the input variable of the LSTM module and the temporally preceding intermediate variable.

4. The method as recited in claim 1, wherein the filter module additionally includes a decoding module and the decoding module connects the LSTM module and the output of the filter module, and when the output variable of the predefinable module is filtered with the aid of the filter module, the output variable of the LSTM module is decoded with the aid of the decoding module in such a way that the output variable of the filter module has the same number of dimensions as the input variable of the filter module forwarded with the aid of the bridging connection.

5. The method as recited in claim 1 wherein the connection between the last module of the modules connected in series and the detection module is implemented with the aid of a third storage module, the third storage module combining the output variable of the last module and at least one output variable of a filter module connecting two consecutive modules of the modules connected in series, into one storage variable.

6. The method as recited in claim 1 wherein an object is detected with the aid of a detection module at the output of the last module of the modules connected in series, and an at least partially autonomous machine is controlled as a function of the detected object.

7. A non-transitory machine-readable storage module on which is stored a computer program for detecting an object with the aid of a system, the system having a plurality of modules connected in series one after the other, at least one connection between a predefinable module and its immediately following module being implemented with the aid of a filter and storage module connected in series in each case, a first module of the modules connected in series being connected to an acquisition unit, and a last module of the modules connected in series being connected to a detection module, the computer program, when executed by a processor, causing the processor to perform:

providing an input variable for the first module of the modules connected in series, with the aid of the acquisition unit; and successively ascertaining along the modules connected in series, starting with the first module of the modules connected in series, an output variable of each of the modules connected in series as a function of an input variable of the respective module and a parameterization of the respective module, the output variable of the predefinable module being filtered with the aid of the filter module, the filter module ascertaining an output variable as a function of the output variable of the predefinable module and a temporally preceding intermediate variable, the filter module ascertaining a temporally instantaneous intermediate variable as a function of the temporally preceding output variable of the predefinable module and a temporally preceding intermediate variable, the temporally preceding intermediate variable having been ascertained as a function of a temporally preceding output variable of the predefinable module, with the aid of the filter module, the output variable of the filter module and at least one input variable of one of the preceding modules of the predefinable module being combined into a storage variable with the aid of the storage module and being supplied as an input variable for the immediately following module;

wherein the filter module additionally has a bridging connection, and when filtering the output variable of the predefinable module with the aid of the filter module, the input variable of the filter module is forwarded with the aid of the bridging connection to the output of the filter module and the input variable of the filter module is added at the output of the filter module to the output variable of the filter module.

8. A device for detecting an object with the aid of a system, the system having a plurality of modules connected in series one after the other, at least one connection between a predefinable module and its immediately following module being implemented with the aid of a filter and storage module connected in series in each case, a first module of the modules connected in series being connected to an acquisition unit, and a last module of the modules connected in series being connected to a detection module, the device configured to:

provide an input variable for the first module of the modules connected in series, with the aid of the acquisition unit; and successively ascertain along the modules connected in series, starting with the first module of the modules connected in series, an output variable of each of the modules connected in series as a function of an input variable of the respective module and a parameterization of the respective module, the output variable of the predefinable module being filtered with the aid of the filter module, the filter module ascertaining an output variable as a function of the output variable of the predefinable module and a temporally preceding intermediate variable, the filter module ascertaining a temporally instantaneous intermediate variable as a function of the temporally preceding output variable of the predefinable module and a temporally preceding intermediate variable, the temporally preceding intermediate variable having been ascertained as a function of a temporally preceding output variable of the predefinable module, with the aid of the filter module, the output variable of the filter module and at least one input variable of one of the preceding modules of the predefinable module being combined into a storage variable with the aid of the storage module and being supplied as an input variable for the immediately following module;

wherein the filter module additionally has a bridging connection, and when filtering the output variable of the predefinable module with the aid of the filter module, the input variable of the filter module is forwarded with the aid of the bridging connection to the output of the filter module and the input variable of the filter module is added at the output of the filter module to the output variable of the filter module.

* * * * *